United States Patent
Matarese et al.

(10) Patent No.: US 9,807,460 B2
(45) Date of Patent: Oct. 31, 2017

(54) OPTIMAL PROVISIONING AND MANAGEMENT OF BANDWIDTH IN A VIDEO-ON-DEMAND SERVICES ARCHITECTURE

(75) Inventors: Joseph Matarese, Portland, OR (US); Andrew Poole, Louisville, CO (US); George Scott Pinson, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 2312 days.

(21) Appl. No.: 10/639,006

(22) Filed: Aug. 11, 2003

(65) Prior Publication Data
US 2005/0039213 A1    Feb. 17, 2005

(51) Int. Cl.
*H04N 7/173*    (2011.01)
*H04N 21/472*    (2011.01)
(Continued)

(52) U.S. Cl.
CPC ... *H04N 21/47202* (2013.01); *H04N 7/17336* (2013.01); *H04N 21/2225* (2013.01); *H04N 21/234381* (2013.01); *H04N 21/2402* (2013.01)

(58) Field of Classification Search
CPC .......... H04L 2/06462; H04L 29/06027; H04L 29/06523; H04N 21/2402; H04N 7/17318;
(Continued)

(56) References Cited

U.S. PATENT DOCUMENTS 4,933,935 A     6/1990 Adams
5,463,620 A *   10/1995 Sriram .......................... 370/412
(Continued)

FOREIGN PATENT DOCUMENTS

CA    2358230 A1    4/2002
EP    0 713 347 A2    5/1996
(Continued)

OTHER PUBLICATIONS

U.S. Appl. No. 09/699,236, Daniel Sheeran.
(Continued)

*Primary Examiner* — Benjamin R Bruckart
*Assistant Examiner* — Anthony Bantamoi
(74) *Attorney, Agent, or Firm* — Bart A. Perkins

(57) ABSTRACT

A video-on-demand server includes interface modules each providing a communication interface between the video-on-demand server and a switching network; an interface to a management module to monitor and provide to the video-on-demand server information on video-on-demand bandwidth utilization of network resources allocated to particular service groups, each service group including video-on-demand customers sharing a same fixed network bandwidth allocation; each interface module communicatively coupled to service groups simultaneously via service gateways; a total bandwidth of the server is an aggregate bandwidth of all the interface modules, and is less than an aggregate bandwidth of all service groups assigned to be serviced by the server, the switching network configured to make the server available for receiving video on demand service requests from all of the service group customers simultaneously; the server adapted to dynamically assign bandwidth of the server to service groups, by adapting the switching network to dynamically change communication connections between interface modules and service groups, the adapta-
(Continued)

tions to the switching network based upon information about the bandwidth utilization of network resources received from the management module.

9 Claims, 4 Drawing Sheets

(51) Int. Cl.
*H04N 21/2225* (2011.01)
*H04N 21/2343* (2011.01)
*H04N 21/24* (2011.01)

(58) Field of Classification Search
CPC ......... H04N 21/47202; H04N 7/17336; H04N 21/25891; H04N 21/23103
USPC ........... 725/86–104; 370/351–430, 217, 221, 370/237; 714/4; 709/226
See application file for complete search history.

(56) References Cited

U.S. PATENT DOCUMENTS

| | | | |
|---|---|---|---|
| 5,745,837 A | 4/1998 | Fuhrmann | |
| 5,822,324 A | 10/1998 | Kostresti et al. | |
| 5,861,919 A | 1/1999 | Perkins et al. | |
| 5,878,224 A * | 3/1999 | Smith | 709/224 |
| 5,940,738 A | 8/1999 | Rao | |
| 6,011,780 A * | 1/2000 | Vaman et al. | 370/237 |
| 6,014,431 A * | 1/2000 | McHale et al. | 379/93.14 |
| 6,026,145 A * | 2/2000 | Bauer et al. | 379/22.03 |
| 6,041,039 A * | 3/2000 | Kilkki et al. | 370/230 |
| RE36,801 E | 8/2000 | Logan et al. | |
| 6,324,184 B1 * | 11/2001 | Hou et al. | 370/468 |
| 6,543,053 B1 * | 4/2003 | Li et al. | 725/88 |
| 6,625,750 B1 * | 9/2003 | Duso et al. | 714/11 |
| 6,725,401 B1 * | 4/2004 | Lindhorst-Ko | 714/47 |
| 6,909,726 B1 * | 6/2005 | Sheeran | 370/468 |
| 6,947,445 B1 * | 9/2005 | Barnhart | 370/468 |
| 6,986,156 B1 * | 1/2006 | Rodriguez et al. | 725/95 |
| 2001/0025378 A1 | 9/2001 | Sakamoto et al. | |
| 2001/0055305 A1 | 12/2001 | Oz et al. | |
| 2002/0059619 A1 * | 5/2002 | Lebar | 725/87 |
| 2003/0016624 A1 | 1/2003 | Bare | |
| 2003/0055971 A1 * | 3/2003 | Menon | 709/226 |
| 2003/0121047 A1 * | 6/2003 | Watson et al. | 725/93 |
| 2004/0165592 A1 * | 8/2004 | Chen et al. | 370/395.1 |
| 2004/0177239 A1 * | 9/2004 | Clift et al. | 712/228 |

FOREIGN PATENT DOCUMENTS

| | | |
|---|---|---|
| WO | WO-99/16247 A1 | 9/1998 |
| WO | WO-99/09741 A1 | 2/1999 |
| WO | WO-01/31605 A1 | 5/2001 |

OTHER PUBLICATIONS

International Search Report for PCT application No. US04/22575 mailed on May 10, 2006.
Office Action for EP application No. 04756974.4 mailed on Apr. 29, 2011.
Supplementary EPO search report for application No. 04756974.4 mailed on Apr. 20, 2010.
Office Action for Europe Application No. 04 756 974.4, mailed on Mar. 16, 2012.

* cited by examiner

OPTIMAL PROVISIONING AND MANAGEMENT OF BANDWIDTH IN A VIDEO-ON-DEMAND SERVICES ARCHITECTURE

FIELD OF THE INVENTION

The present invention relates generally to the delivery of Video On-Demand (VOD) services and more particularly, to the provisioning and monitoring of the delivery of the VOD services.

BACKGROUND OF THE INVENTION

In recent years, the media industry has expanded its horizons beyond traditional analog technologies. Audio, photographs, and even feature films are now being recorded or converted into digital formats. With this conversion to digital formats comes the ability of the media industry to provide Video-On-Demand (VOD) services to subscribers. VOD is similar to a traditional video rental service except that the video is delivered directly to the subscriber through a media delivery network such as a cable network.

In a conventional VOD delivery system, VOD services are provided to the subscribers via a delivery network. The subscribers are divided into service groups. A fixed bandwidth for delivery of VOD services is associated with each service group. The bandwidth the VOD server has available to provide VOD services is greater than or equal to the sum of the bandwidth of the service groups. The VOD server is provisioned with this bandwidth to ensure that a subscriber is never denied service because the VOD server does not have enough bandwidth. This increases the cost of the VOD server.

Therefore, what is needed is a method for optimally provisioning and managing the bandwidth of the VOD server.

BRIEF SUMMARY OF THE INVENTION

The invention is a technique for optimal provisioning and management of bandwidth in a video-on-demand services architecture. In one embodiment of the present invention a VOD system, includes a VOD server and a delivery network. The VOD server generates VOD services for subscribers while the delivery network is coupled to the VOD server for delivering the VOD services to the subscribers. The bandwidth of the VOD server to provide VOD services to the subscribers is less than the bandwidth of the delivery network to provide the VOD services to the subscribers. In another aspect of the invention, the VOD server has flexibility in selecting a path in the delivery network by which a VOD service is provided. The delivery network can also be reprovisioned based on monitored usage of the delivery network.

DETAILED DESCRIPTION OF A PREFERRED EMBODIMENT OF THE INVENTION

Figure 1:
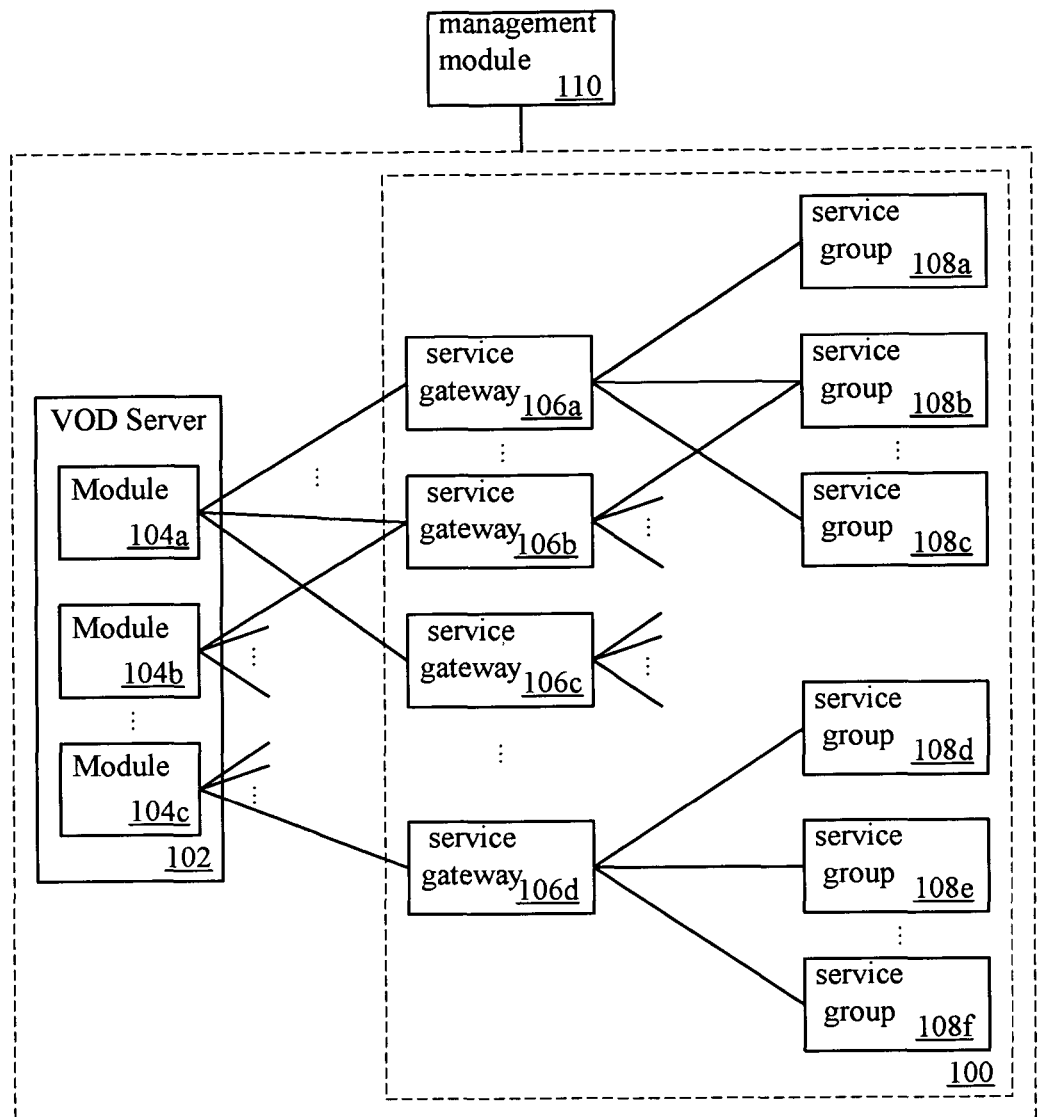
FIG. 1 is a block diagram of a VOD server and a distribution network in which the present invention may be implemented.
Figure 2:
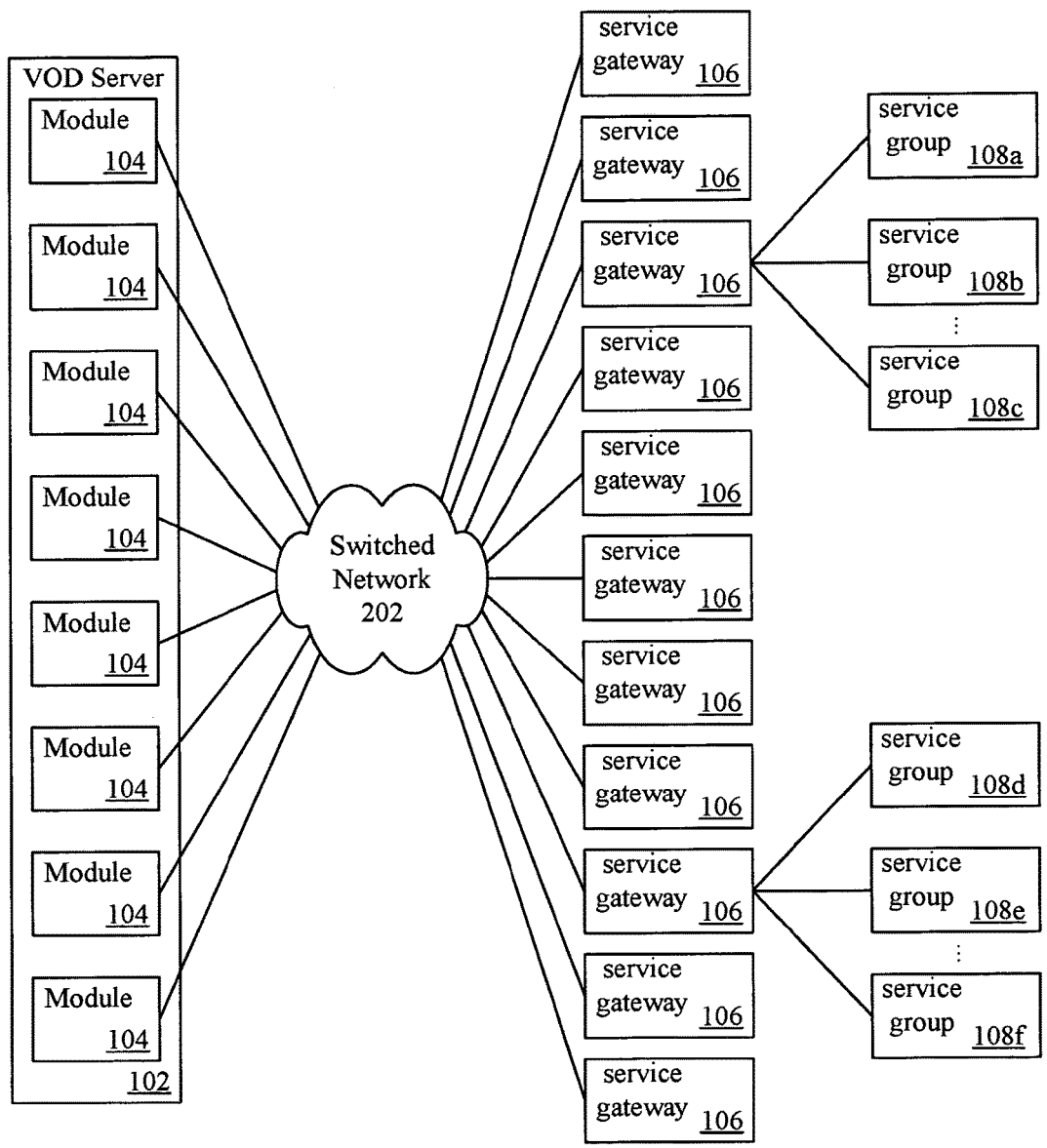
FIG. 2 is a block diagram of the VOD server, a distribution network and a switched network in which the present invention may be implemented.

The present invention relates to the provisioning and monitoring of a VOD server 102 and an associated delivery system 100, as shown in FIGS. 1 and 2.

As shown in FIG. 1, the delivery system 100 connects one or more VOD servers 102 to one or more service groups 108a-f such that the VOD servers 102 provide the service groups 108a-f with content in the form of streaming digital video and generally also audio, though either audio or video may be provided. Preferably a single VOD server 102 is provided that is scaleable, however, multiple servers may be provided, for example, if the servers are not scaleable. Each service group 108a-f is a group of subscribers that all share the same bandwidth in the delivery network 100. Each service group 108a-f may comprise, for example, one hundred to over a thousand subscribers.

The topology of the delivery network 100 allows the VOD server 102 to deliver unique content to each service group 108. Thus, the VOD server 102 tailors the content to the desires of the subscriber. The subscriber may request that the VOD server 102 provide a particular video program, and may request that the VOD server 102 perform trick functions such as: pause, rewind, fast forward, slow play, slow rewind, or some other function on the video.

An interface between the delivery network 100 and the VOD server 102 may be provided by one or more modules 104a-c such as: a 10 Gigabit Ethernet Module, a Gigabit Ethernet Module, a 10/100 BaseT Ethernet module, an ATM OC-3/STM-1 module, an ATM OC-12/STM-4 module, an DVB-ASI module, an QAM 64 module, an QAM 256 module, or any module that allows the VOD server 102 to communicate to the subscribers over the delivery network 100. In a switched network, Ethernet or ATM is preferably used. Higher speed interfaces may be utilized in the invention without changing the nature of the invention. The bandwidth of the VOD server 102 may be proportional to the number of modules 104a-c with which the VOD server 102 has been provisioned.

Each module 104 in the VOD server 102 may be connected to one or more service gateways 106 via network links (e.g. Gigabit Ethernet links). In addition, each service gateway 106 may be connected to one or more modules 104. For example, a connection may be provided between a service gateway 106b and a module 104a and between the service gateway 106b and the module 104b as in FIG. 1. The connection between a service gateway and a module may be direct or through one or more intermediaries. The intermediaries may include distribution hubs, switches or other devices that provide routing or transmission functionality in the delivery network 100. Each of the service gateways 106a-d may split the VOD services being sent by the VOD servers 102 into one or more service groups 108. A service gateway 106a-d may deliver video streams to each of several service groups (e.g. 108a-c) via a delivery channel such as one or more Quadrature Amplitude Modulation (QAM) channels and may deliver different video streams to each service group. A delivery channel is a mechanism for carrying one or more video streams and may include one or more QAM channels, a Digital Subscriber Line (DSL) or a wireless access point. In the following description of the invention the delivery channels are described as QAM channels. However, it will be apparent that any delivery channel may be used in place of a QAM channel.

A QAM channel may contain multiple video streams. Where each QAM channel has an upper limit (QAM channel bandwidth) on the number streams of digital video that it can deliver (e.g. 10). Thus, each service group 108a-f has an upper limit (a service group bandwidth) on the number of digital streams that may be delivered to it. A service gateway 106a-d may use any delivery mechanism that allows the VOD server 102 to deliver the VOD services to subscribers in the service group 104 such as by sending MPEG-2 Single Program Transport Streams over IP (Internet Protocol)/Ethernet.

Each service gateway 106a-d has a service gateway bandwidth that is a sum of the service group bandwidth of the service groups 108a-f or portions of the service groups connected to that particular service gateway 106a-d. Each service group may be connected to one or more service gateways. Whenever a subscriber in a particular service group 108a-f requests a VOD service from the VOD server 102 and the service group bandwidth that would be delivered to that particular service group 108a-f would be exceeded, then the VOD server 102 must deny the subscriber's request. To maintain a reasonable level of service, the probability of a request being denied, while greater than zero is low, typically between 0.1 and 1%. The lower the probability of service denial, the better the resulting subscriber experience.

The delivery network 100 may provide multiple paths between the VOD server 102 and the subscriber. Each of the paths may be divided into multiple links. Each of the paths may share some of the links among themselves. A management module 110 may monitor the state of each of the links either through the VOD server 102 or by interacting directly with the device providing the link.

Figure 6A:
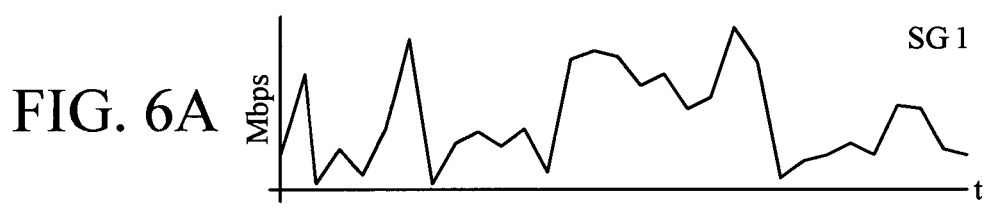
FIGS. 6A-C is a group of graphs showing the time dependence of bandwidth utilization of multiple service groups.
Figure 6B:
Figure 6C:
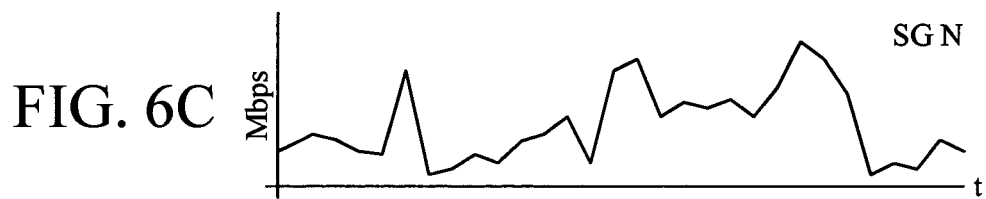
Figure 6D:
FIG. 6D is a graph showing the time dependence of bandwidth utilization of the VOD server.

In one aspect, the invention provides a method for connecting a set of the modules 104 to a set of the service groups 108, such that no one service group 108 is connected to only one of the modules 104. Bandwidth on the VOD server 102 may be assigned via any of the modules 104 comprising the VOD server to each service group 108 as needed. This is more efficient than conventional techniques as it allows the VOD server to be provisioned with fewer modules. During the VOD service's busiest hours of day, demand for bandwidth in a service group may experience rapid variation, in particular "peaks" or "spikes", that exhaust the bandwidth capacity of the QAM channels feeding the service group as shown in FIGS. 6A-C. In FIGS. 6A-D the horizontal axis is time and the vertical axis is bandwidth utilization. Therefore number of QAM channels and associated bandwidth feeding a service group must be sized appropriately large to accommodate these demand spikes. Because the VOD server aggregates bandwidth demand over all service groups, the bandwidth at the VOD server will have a much smaller relative variation owing to statistical averaging as shown in FIG. 6D. In other words, the decrease in variation is a consequence of summing up the demand of all the subscribers to the VOD server 102 as opposed to summing up the demand of the subscribers in one service group 108. The present invention takes advantage of the smaller variation present at the server to provision the VOD server with fewer modules 104 than with the conventional method, thereby reducing the cost of the VOD server. The conventional method would ensure that the bandwidth of the VOD server was greater than or equal to the bandwidth of all the service groups added together.

The VOD server 102 may be connected to a switching network 202 via multiple modules 104, such as Gigabit Ethernet modules, as shown in FIG. 2. Each service gateway 106 in turn is connected to one or more service groups 108, by way of one or more QAM channels though each service group may be connected to multiple gateways. This will give the VOD server 102 the flexibility of not having to assign the QAM channel supplying a service group 108 to a particular module 104 as in the conventional system. The switching network 202 may include an Ethernet network or some other switching network that allows the VOD server 102 to communicate efficiently with multiple service gateways 106.

In contrast to the present invention, a conventional VOD server would ensure that the module, which is connected to one or more service gateways, has a bandwidth that is greater than or equal to the sum of the service gateway bandwidth of each of the service gateways that are connected to it. This is done to ensure that requests for VOD services are not being denied due to lack of module bandwidth. The bandwidth of the VOD server is equal to the sum of the bandwidth of all the modules. Due to the wide variation in demand for bandwidth in each of the service groups, while at any instant in time one or more of the service groups may have used up all their bandwidth, the VOD server may only have used 60 to 70% of its bandwidth.

In the present invention, the VOD server 102 is generally provisioned with fewer modules 104 than a conventional system would be. However, if the server 102 is not provisioned with enough modules 104 then a subscriber might be denied service because the VOD server 102 does not have enough bandwidth. Therefore, the provisioning of the VOD server 102 with bandwidth in the form of modules 104, preferably takes into account typical use patterns of subscribers in all the service groups 108. The use patterns may be summed together because the VOD server 102 can assign service to different paths in order to make efficient use of system resources. To ensure that the VOD server 102 is provisioned with enough bandwidth the probability that demand for bandwidth on the VOD server 102 will be greater then some value over a set period may be calculated. The VOD server is provisioned with a set bandwidth. There is a probability that the demand for bandwidth at the VOD server may exceed the set bandwidth. The probability may be below a set value. The probability may be calculated using past subscriber behavior or some other means.

A probability P_network is defined as the probability that a subscriber will be denied service because there is not enough bandwidth in the delivery network 100. A probability function P_server is defined as the probability that a subscriber will be denied service because the VOD server 102 does not have enough bandwidth. The probability function P_server is a function of the bandwidth of the VOD server 102. In general, as the bandwidth of the VOD server 102 increases the value of the probability function P_server decreases. Further, as the bandwidth of the VOD server 102 decreases the value of the probability function P_server increases. In one aspect of the invention, the bandwidth of the VOD server 102 is provisioned such that P_server does not exceed a set value. Further, the set value may be less than P_network, in other words:

P_network>P_server

In another alternate embodiment, the set value might also be set to 0.1-1% of service requests. A service request might be denied for reasons other than lack of bandwidth on the VOD server 102, such as lack of bandwidth in the delivery network. Provisioning the VOD server 102 with bandwidth above certain point will have a marginal (i.e. insignificant) effect on the probability of service requests being denied as other bandwidth limitations in the delivery system overwhelm any bandwidth limitation that the VOD server 102 might impose. Therefore, in a further alternate embodiment, the set value might be such that a decrease in the set value has no appreciable effect on the probability that a subscriber might be denied service for any reason.

These probabilities may be calculated based on past knowledge of the behavior of the subscribers in order to predict their future behavior. It may also take into account the past behavior of other media viewers not connected to the video server 102, which might have similar use patterns to the subscribers. The probability may also be calculated from a mathematical model of the subscribers demand for bandwidth. Known techniques for implementing mathematical models based on statistical behavior may be applied.

A management module 110 preferably has an ability to monitor and report on all currently active subscriber sessions and server streams. The management module 110 may report on currently active sessions and keep an archive on completed sessions to perform this monitoring.

The management module 110 preferably maintains detailed information of the nodes and links of the delivery network topology. Such topological information may include an inventory of the various components of the VOD server 102 such as the modules 104, the service gateways 106, and the service groups 108 and the connectivity between them (i.e. the connection provided by the communication links). The VOD server 102 may create logical groups of bandwidth, where a logical group of bandwidth may be defined as: one or more QAM channels, one or more service groups, one or more service gateways or one or more modules. For example, a table mapping the delivery network topology may contain a row for each said logical group in the delivery network 100. Columns of such a table may contain the bandwidth associated with the logical group as well as the identification of a physical entity like a service gateway, Gigabit Ethernet link or QAM channel associated with the logical group. Each row may also contain information regarding every connection associated with each said logical group. The delivery network topology could alternatively be stored as a graph, a linked listed, a hierarchical database, or some other data structure.

The management module 110 may provide an operator of the delivery network with the ability to modify the delivery network topology table as needed to reflect additions, deletions or other changes of the VOD server 102 resources, the service gateways 106 or the service groups 108. Such modifications may be made during scheduled maintenance windows or while the system is live to subscribers.

Figure 3:
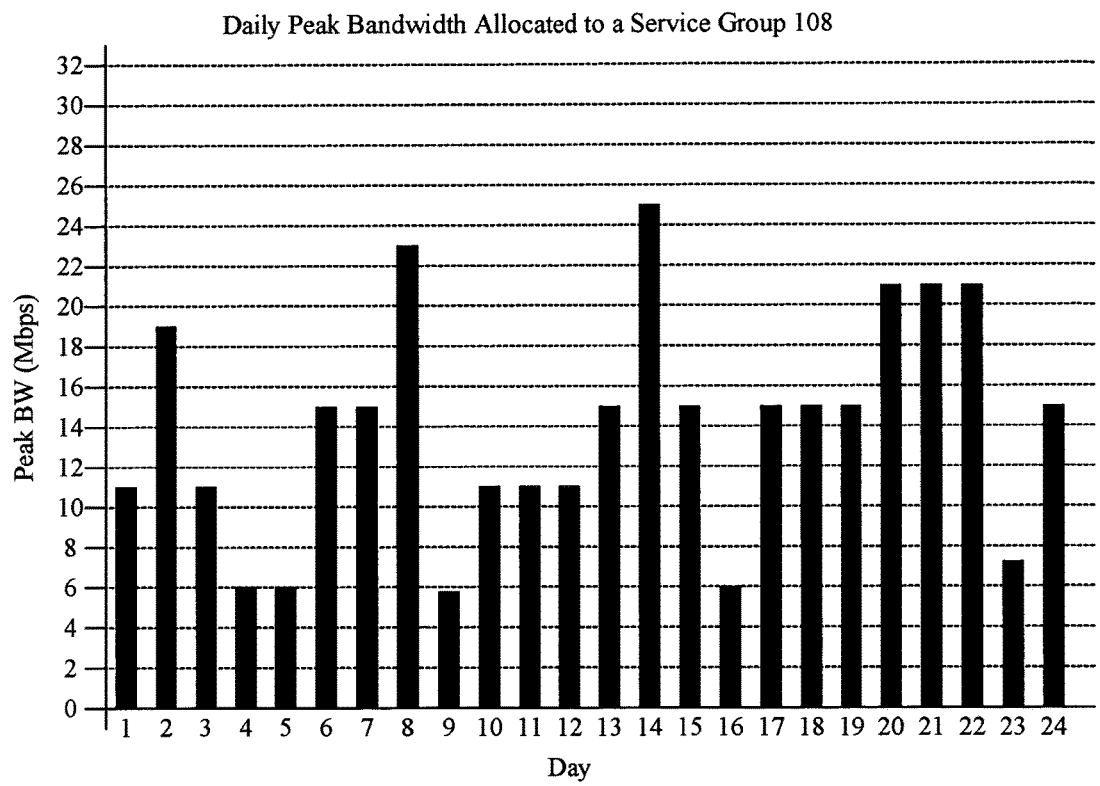
FIG. 3 is a graph showing an exemplary daily peak demand of a service group in the system of FIG. 1 or 2.
Figure 4:
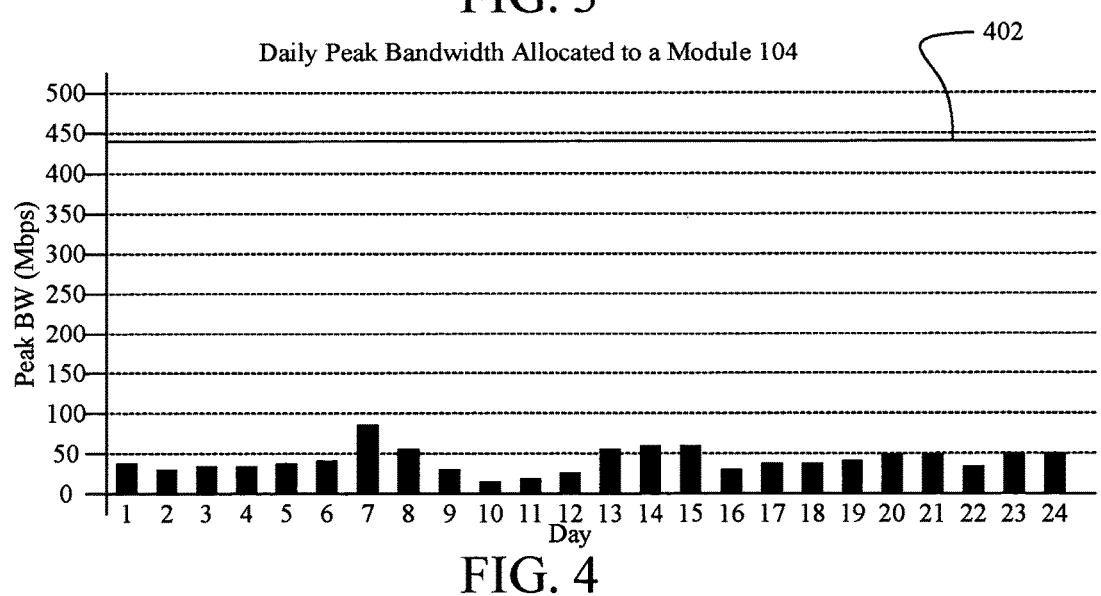
FIG. 4 is a graph showing an exemplary daily peak demand of a module in the system of FIG. 1 or 2.
Figure 5:
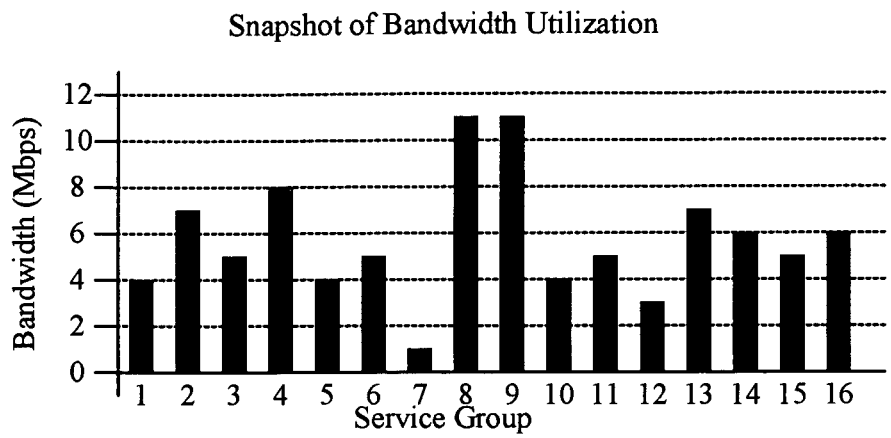
FIG. 5 is a graph showing the bandwidth utilization of multiple service groups at one instant time.

The management module 110 may monitor the bandwidth utilization and availability across all resources in the delivery network. In particular, the management module 110 may track and record bandwidth utilization on the VOD server 102, the modules 104, the service gateways 106, the QAM channels, the service groups 108a-f and any other logical groups of bandwidth, and any link between any node in the delivery network. The information on bandwidth utilization may be obtained by, polling devices in real time or by knowing the network topology and knowing what is being transmitted. Archived data on this bandwidth utilization may be viewed subsequently for system planning and trend analysis. Examples of reports showing said bandwidth utilization are shown in FIG. 3 and FIG. 4. Some or all of the features described herein as being performed by the management module 110 could be performed by other elements of the system such as the VOD server 102. Similarly, features described herein as being performed by the VOD server 102 may be performed by the management module 110.

FIG. 3 is a chart showing the daily peak demand for bandwidth allocated to the service group 108. FIG. 4 is a chart showing the daily peak demand for bandwidth allocated to the Module 104, which is equivalent to, the daily maximum of the sum of the demand in eleven service groups 108. FIG. 3 shows the daily peak demand for bandwidth in a single service group 108, which may have a bandwidth of 150 megabits per second (Mbps), while typical daily peak utilization may vary from sixty Mbps to 100 Mbps. While FIG. 4 shows the daily peak utilization for the module 104 serving eleven such service groups varying from fifteen Mbps to eighty-six Mbps. A VOD server 102 provisioned to service subscribers as in the prior art would ensure that the Module 108 providing service to eleven service groups each with a bandwidth of forty Mbps would have a bandwidth greater than four hundred and forty Mbps as shown by the line 402 in FIG. 4. In contrast, a VOD server 102 provisioned to service a delivery network such as in FIG. 2 could have far fewer modules and more modules may be added later as demand increases. In one aspect of the present invention one module 104 is not assigned to provide VOD services to a small subset of the service groups linked to the VOD server 102 but can provide VOD service to all or a large subset of the service groups that are linked to the VOD server 102.

A single service group will have wide temporal variation in demand for bandwidth relative to its bandwidth capacity as shown in FIGS. 6A-E. In contrast, the temporal variation of bandwidth demand relative to aggregate bandwidth capacity decreases when the demand for bandwidth associated with a number of the service groups is summed together as shown in FIG. 6F. The present invention takes advantage of this decrease in variation to provision a VOD server with less bandwidth than if the VOD server was provisioned in the conventional manner.

The delivery network topology information preferably allows the VOD server 102 to choose a video delivery path by way of any of a combination of links between a VOD server module 104 and the a subscriber device in a service group, each time the subscriber makes a request. The VOD server 102 may choose a path based upon the bandwidth utilization of the path or links or a priority level of the path or links. If a failure is detected on a particular link, such as a QAM channel in the delivery network, the VOD server 102 may choose to avoid this path for some period of time. For example, the VOD server 102 may de-prioritize that particular link and send an alert to the operator of the delivery network via an appropriate protocol such as Simple Network Management Protocol and/or through a Graphical User Interface and/or through some other means that allows the VOD server 102 to contact the operator of the delivery network. A VOD server 102 might detect a failure in the particular link by noting a high error rate, or high demand for the retransmission of data. The transmission method might include error detection and correction code that would help in the detection of a failed link. The VOD server 102 may avoid using the de-prioritized link again until: the operator intervenes to resolve the underlying failure and then explicitly re-prioritizes the link, or bandwidth is completely consumed on the other links feeding the service group.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing form the spirit and scope of the invention.

What is claimed is:

1. A video-on-demand server, comprising:
a plurality of interface modules, each interface module providing a communication interface between the video-on-demand server and a switching network;
an interface to a management module, the management module adapted to monitor and provide to the video-on-demand server information on video-on-demand bandwidth utilization of network resources allocated to particular service groups, each service group comprising a plurality of video-on-demand customers sharing a same fixed network bandwidth allocation;
each interface module communicatively coupled to a plurality of service groups simultaneously via a plurality of service gateways;
a total bandwidth of the server is an aggregate bandwidth of all the interface modules, and is less than an aggregate bandwidth of all service groups assigned to be serviced by the server, the switching network configured to make the server available for receiving video on demand service requests from all of the service group customers simultaneously;
the server adapted to dynamically assign bandwidth of the server to service groups, by adapting the switching network to dynamically change communication connections between interface modules and service groups, the adaptations to the switching network based upon information about the bandwidth utilization of network resources received from the management module.

2. The server of claim 1, further comprising:
provisioning bandwidth to each of the interface modules based upon the historical use patterns of particular service groups.

3. The server of claim 1, further comprising:
each interface module capable of being adapted to service only a portion of the bandwidth requests of each of a plurality of service groups.

4. The server of claim 1, further comprising:
at least one of the interface modules is adapted to have less bandwidth than an aggregate bandwidth of the plurality of service groups to which it is assigned.

5. The server of claim 1, further comprising:
the server adapted to generate logical groups of bandwidth from one or more of: (a) one or more QAM channels, (b) one or more service groups, (c) one or more service gateways, or (d) one or more interface modules.

6. The server of claim 1, further comprising:
the server adapted to cause the switching network to select a video-on-demand delivery path to a service group.

7. A process of managing bandwidth allocation on video-on-demand server, comprising:
allocating an aggregate bandwidth of the server to a plurality of interface modules, each interface module providing a communication interface between the server and a switching network;
receiving information from a management module on video-on-demand bandwidth utilization of network resources allocated to particular service groups, each service group comprising a plurality of video-on-demand customers sharing a same fixed network bandwidth allocation;
adapting each interface module to be communicatively coupled to a plurality of service groups simultaneously via a plurality of service gateways, the switching network configured to make the server available to receive video on demand service requests from all of the service group customers simultaneously;
allocating a total bandwidth of all the interface modules to be less than an aggregate bandwidth of all service groups assigned to be serviced by the server;
dynamically assigning bandwidth of the server to service groups, by adapting the switching network to dynamically change communication connections between interface modules and service groups, the adaptations to the switching network based upon information about the bandwidth utilization of network resources received from the management module.

8. A video on demand server, comprising:
a plurality of delivery network interface modules, each delivery network interface module providing an interface between the video server and a data delivery network and each delivery network interface module configured to deliver audio and/or video to one or more service gateways that are assigned to the each delivery network interface module;
the video server allocating a fixed bandwidth in the delivery network to each service gateway, the fixed bandwidth allocated to each service gateway comprising a sum of a bandwidth allocated to each subscriber service group coupled to the each service gateway;
the video server configured such that a sum of the fixed bandwidth allocated to all of the service gateways and available to be demanded by the service gateways from the video server during operation of the video server exceeds a total bandwidth delivery capability of the video server; and
the video server configured to alter the assignment of service gateways to one or more of the delivery interface modules according to real-time bandwidth demands of the one or more service gateways during operation of the video server.

9. The video on demand server of claim 8, further comprising:
the video server configured to assign the delivery network interface modules to the one or more service group gateways in a manner that no service group is provided with audio and/or video from only one delivery network interface module.

* * * * *